United States Patent
Abuh

(10) Patent No.: US 11,844,022 B2
(45) Date of Patent: Dec. 12, 2023

(54) SYSTEMS FOR WIRELESS PERSONAL AREA NETWORKS SIGNAL TRANSMISSION AND METHODS OF USE THEREOF

(71) Applicant: SOUTHEAST TOYOTA DISTRIBUTORS, LLC., Deerfield Beach, FL (US)

(72) Inventor: Idoko Abuh, Deerfield Beach, FL (US)

(73) Assignee: SOUTHEAST TOYOTA DISTRIBUTORS, LLC., Deerfield Beach, FL (US)

( * ) Notice: Subject to any disclaimer, the term of this patent is extended or adjusted under 35 U.S.C. 154(b) by 258 days.

(21) Appl. No.: 17/378,344

(22) Filed: Jul. 16, 2021

(65) Prior Publication Data

US 2022/0022138 A1 Jan. 20, 2022

Related U.S. Application Data

(60) Provisional application No. 63/054,085, filed on Jul. 20, 2020.

(51) Int. Cl.
*H04W 52/02* (2009.01)
*H04W 4/80* (2018.01)
*H04W 4/70* (2018.01)

(52) U.S. Cl.
CPC ......... *H04W 52/0235* (2013.01); *H04W 4/70* (2018.02); *H04W 4/80* (2018.02)

(58) Field of Classification Search
CPC ..... H04W 52/0235; H04W 4/80; H04W 4/70; H04W 12/06; H04W 52/0212; H04W 4/027; H04W 84/18; G01C 21/16; H04L 67/10
See application file for complete search history.

(56) References Cited

U.S. PATENT DOCUMENTS

2018/0040093 A1* 2/2018 Boesen ............ G01C 21/3438
2019/0163848 A1* 5/2019 McGranahan ...... G06F 11/3447
2021/0110148 A1* 4/2021 Zajac .................... G07C 5/008

* cited by examiner

*Primary Examiner* — Iqbal Zaidi
(74) *Attorney, Agent, or Firm* — ArentFox Schiff LLP

(57) ABSTRACT

Systems and methods of use thereof for interconnecting a plurality of different electromechanical systems within an environment via Wireless Personal Area Networks (WPAN), such as Bluetooth Low Energy®. The system may include a primary system configured to include at least two states each corresponding to a signal, such as a 12V representing the 'on' state and a 0V signal to the 'off' state. The primary subsystem may include a signal determination device configured to determine the state of the primary subsystem and produce the corresponding signal, wherein the associated first communication device may transmit the produced signal over a WPAN to the second communication device associated with the accessory system. The accessory system may further include an accessory operation device configured to cause or inhibit a state change of the accessory subsystem based on the signal received by the second communication device.

7 Claims, 6 Drawing Sheets

SYSTEMS FOR WIRELESS PERSONAL AREA NETWORKS SIGNAL TRANSMISSION AND METHODS OF USE THEREOF

CROSS-REFERENCE TO RELATED APPLICATIONS

This application claims priority to U.S. Provisional Patent Application Ser. No. 63/054,085, filed on Jul. 20, 2020, entitled "SYSTEMS FOR WIRELESS PERSONAL AREA NETWORKS SIGNAL TRANSMISSION AND METHODS OF USE THEREOF". The disclosure of the priority application is hereby incorporated in its entirety by reference.

TECHNICAL FIELD

Aspects of the present disclosure relate to systems and methods of use thereof for transmitting signals over Wireless Personal Area Networks (hereinafter interchangeably referred to as, "WPANs"), such as may include one or more Bluetooth Low Energy® and/or other similar devices, to interconnect a plurality of electrical, mechanical, and/or electromechanical subsystems within a variety of different environments, such as automotive or household environments.

BACKGROUND

In a variety of environments that employ a range of interoperable electrical systems, such as automotive, household, commercial, etc., interoperation of accessory electrical subsystems, which may, for example, be installed and/or include a wide variety of modifications made post production, depends on tapping signals from primary subsystems to utilize wired communications. For example, in an automotive application, the ignition power as a primary subsystem may be tapped such that the operation of an accessory subsystem, such as selective dome lighting operation, may be integrated to be dependently operational based on the primary subsystem.

SUMMARY

There remains an unmet need for systems configured to transmit signal transmissions, such as over or otherwise including Bluetooth Low Energy® technology, that do not rely on wired communications of the related art.

Aspects of the present disclosure describe systems and methods of use thereof configured to interconnect a plurality of different electromechanical systems within an environment via the transmission of signals via WPANs, such as may include one or more Bluetooth Low Energy® devices. The different electromechanical systems may, for example, include one or more primary and accessory subsystems within an environment, such as a vehicle electrical system. The interconnection in such environment may involve, for example, relating operation of the vehicle power system to other subsystems, such as turning on courtesy lights, turning on undercar lighting, or unlocking doors, which may, for example, be implemented during manufacture or as part of an aftermarket installation.

An example such system may include a primary subsystem configured to include at least two states, such as an 'on' state and an 'off' state, wherein each state may be represented by a signal, wherein the signal may correspond with the signals implemented in the environment in which the system is being implemented. For example, a 12V power source or signal corresponding to the 'on' state and a 0V source or signal corresponding to an 'off' state in a 12V automotive environment. However, in other environments, other signals, such as in 6V or 24V in some automotive applications, or 110V or 220V alternating current (AC) home or other non-automotive applications, for example, as well as a wide range of other potential voltage environments, may be implemented to correspond to the 'on' state. The primary subsystem may further include a signal determination device coupled to a transmitting device, wherein the signal determination device may be configured to produce a signal corresponding to the state of the primary subsystem. The primary subsystem may further include a first communication device coupled to the signal determination device, the first communication device being configured to wirelessly transmit the produced signal via a WPAN. In one example, the signal determination device may further be configured to step down the voltage of the determined signals corresponding to at least one of the components or states of the primary subsystem. For example, the signal determination device may be configured to step down the 12V signal to a 3.3V signal for certain implementations. In another example, however, the signal determination device may not necessitate stepping down the 12V signal to a 3.3V signal, and may instead rely on devices that are configured to interoperate with a voltage that corresponds to the determined signal. The first communication device may be configured to wirelessly transmit the signal corresponding to the state of the primary subsystem to an accessory subsystem, wherein the accessory subsystem may be configured to include a second communication device for receiving the signal, which may in turn be coupled to an accessory operations device. The second processing device may be configured to determine the signal corresponding to the state of the primary electromechanical subsystem. The accessory operations device may be configured to cause or inhibit a state change of the accessory subsystem, for example, based on the signal received by the second communication device. In one example, the second communication device may be further configured to step up the received signal voltage to the original determined signal, such as stepping up the 3.3V signal back up to the 12V state of the primary subsystem. Thus, the signal and voltage information corresponding to the state of the primary electromechanical subsystem may be wirelessly communicated to an accessory electromechanical subsystem via wireless technology, instead of traditional physical wiring methods being necessarily used throughout the environment in which the primary and accessory subsystems are implemented.

Additional advantages and novel features of these aspects will be set forth in part in the description that follows, and in part will become more apparent to those skilled in the art upon examination of the following upon learning by practice of the disclosure.

DETAILED DESCRIPTION

Figure 1:
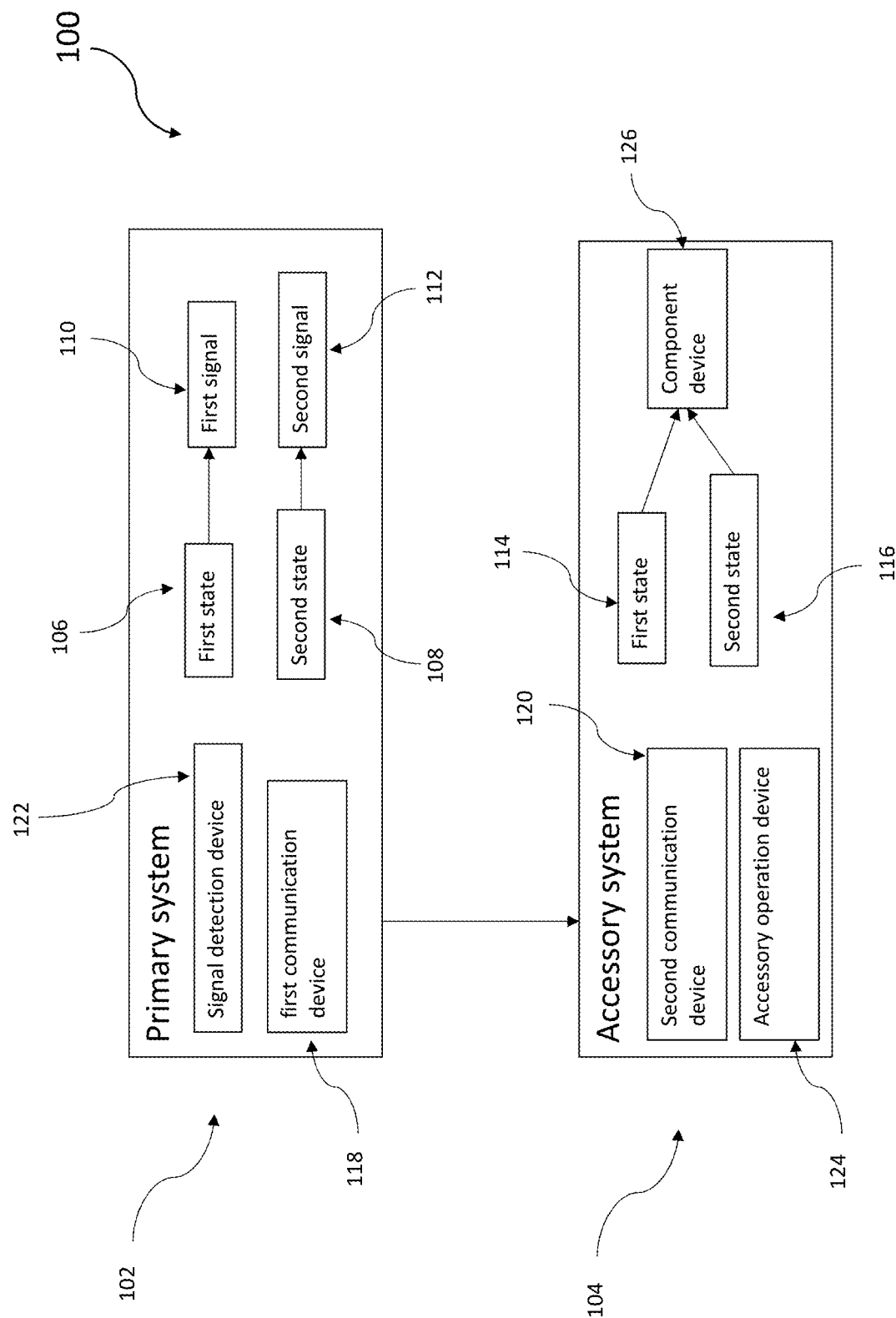
FIG. 1 shows a representative diagram of various components of a primary subsystem and a secondary or accessory subsystem for an example system according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the term approximately may be used as a modifier for a geometric relationship among elements or for the shape of an element or component. While the term approximately is not limited to a specific variation and may cover any variation that is understood by one of ordinary skill in the art to be an acceptable variation, some examples are provided as follows. In one example, the terms approximately may include a variation of less than 10% of the dimension of the object or component. In another example, the term approximately may include a variation of less than 5% of the object or component. If the term approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein are installed an in an in-use orientation. In order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

An automotive environment, for example, may include a plurality of different electrical, mechanical, and/or electromechanical systems or subsystems that correspond to different aspects of vehicle function. Further, these systems/subsystems may be configured to be interconnected, such that the state of one system/subsystem may influence, inform, or otherwise cause the implementation of a corresponding state or set of states in a separate system/subsystem. In one example, a primary system may be comprised of an electromechanical system with at least two different states, such as an 'on' state and an 'off' state, for example, wherein the state of the subsystem may determine the operation of a separate subsystem, the separate subsystem being also interchangeably referred to in this example as an accessory system. For example, in vehicles powered by internal combustion engines, the subsystem including the ignition switch may be considered in this example to be a primary subsystem, such that the state of the ignition power subsystem influences the state of various other accessory subsystems in the vehicle. Continuing the above example, if the ignition power is in an 'on' state, an accessory subsystem, such as a dome light operation subsystem, may be configured to be in an 'off' state. Conversely, the dome light subsystem may be configured to be in an 'on' state if the ignition power is in an 'off' state and a door is determined to be in an 'unlatched' state (e.g., via another subsystem), for example.

In the related art, accessory electromechanical subsystems have typically been configured to interoperate with primary electromechanical subsystems via the transmission of state related data utilizing physical wires. In such related art examples, the signal of the primary subsystem corresponding to the state of that primary subsystem, may be physically connected (also interchangeably referred to herein as "tapped into") with the accessory subsystem, such that a signal, for example, may be generated by the primary subsystem being powered, and thus the corresponding state of the primary subsystem may thereby be transmitted to the accessory system via the physical electrical wiring. However, this related art implementation as described above has raised a plurality of different problems. On one hand, the need for physical wires to be used to electrically connect the different subsystems requires that additional wiring be installed throughout the vehicle environment during the vehicle fabrication process and/or when an aftermarket change or addition in operation is made. Not only does the above described related art approach increase vehicle fabrication/accessory installation times and associated labor costs, the installation of the wiring also introduces the possibility that the wiring may fail due to corrosion or due to the effects of water leaks, for example, as well as any of wide variety of other damage may occur either during installation or during use of the vehicle (e.g., due to faulty installation or increased likelihood of failures occurring in the additional installed wiring). Additionally, the electrical wires necessary in the traditional system approach may limit the physical location at which an accessory system may be physically placed in the environment. For example, if wiring cannot (or cannot easily) reach a particular location in the vehicle, an accessory system may not be readily located in that physical region. In addition, for example, the proliferation of such wiring may result in other drawbacks, such as adding to the overall vehicle weight of the vehicle, thereby potentially affecting performance and economy. Thus, the versatility and application of accessory systems may be limited by the need for electrical wiring in related art approaches.

In yet another example of disadvantages of the related art implementation of interconnected electromechanical systems in a variety of different environments, problems may arise as a result of the need to tap into one electromechanical subsystem in order to determine the state of that subsystem and/or to provide a signal corresponding to the state in order to initiate communication or data transfer between that subsystem and another subsystem. For example, in an automotive environment, a plurality of accessory subsystems, such as dome lights, under vehicle lighting, and automatic door locks may all contemporaneously rely on the state of the ignition power. Thus, in the related art implementation of wired interconnection of electromechanical subsystems, a primary subsystem may need to have multiple wired connections thereto, each wired connection corresponding to each dependent accessory subsystem. However, providing multiple wired connections from a single system increases the likelihood of electrical or mechanical failure, in addition to potentially reducing the electrical efficiency of current delivery within or by the primary system, among other problems. Further, with electrical wiring, there may be no readily available pathway for creating a physical connection with such features as a USB charging circuit, and thus systems employing features such as a USB charging circuit may not be readily capable of implementation as an accessory system utilizing traditional methods of interconnecting electromechanical systems.

To address these various unmet needs, as well as others, aspects of the present disclosure relate to systems and methods for providing transmission of signals and/or transferring state information for a primary electrical, mechanical, or electromechanical system or subsystem to an accessory electrical, mechanical, or electromechanical system or subsystem without employing or without solely employing wired connection thereof. Specifically, in one example implementation, aspects of the present disclosure relate to employing signal transmission over WPAN using, for example, Bluetooth Low Energy® technology and/or other similar technology for the transmission of signals, states, or data or other information between a primary electrical, mechanical, or electromechanical systems or subsystems and an accessory electrical, mechanical, or electromechanical system or subsystem in a plurality of different environments, such as automotive environments, household environments, and other environments, such as recreational vehicles boats.

For use in accordance with aspects of the present disclosure, electrical, mechanical, and/or electromechanical devices or systems that are not physically wired may communicate or interoperate via a WPAN, wherein the WPAN may include a personal, short-range wireless network for interconnecting devices or systems contained within a limited area, or otherwise located within a specific distance relative to one another. WPANs may include a range of features and methods that connect a plurality of devices using short-range communication protocols, such as a Bluetooth® protocol, one or more Bluetooth® Low Energy devices, or a Zigbee® protocol, which protocols may provide wireless connectivity to peripheral devices via wireless links that allow connectivity within a specific distance (e.g., up to 5 meters, 10 meter, 20 meters, 100 meters).

Specifically with regard to Bluetooth® technology, data may be transferred or otherwise exchanged among fixed and mobile devices over short distances using short-wavelength ultrahigh frequency (UHF) radio waves in the industrial, scientific, and medical radio bands from 2.40 GHz to 2.480 GHz., by implementing a short-range wireless communication protocol that supports a WPAN that may include a central device (e.g., a master device) and at least one peripheral device (e.g., a slave device). However, because traditional Bluetooth® technology may be implemented as a metaphorical data transfer super-highway, the technology may require a level of power consumption that renders Bluetooth® impractical in certain applications, such as for applications in which an infrequent transfer of data occurs, or when parasitic draw from the power source must be avoided.

To address the potential power consumption issue associated with Bluetooth®, as well as other potential issues, Bluetooth Low Energy® was developed and adopted for use in various applications in which an infrequent transfer of data occurs or when parasitic draw from the power source is sought to be avoided, for example. Bluetooth Low Energy® exploits the infrequent transfer of data in such situations by using a low duty cycle operation, and switching at least one of the central device (hereinafter also interchangeably referred to as "primary systems") and/or the peripheral device(s) (hereinafter also interchangeably referred to as "accessory systems") to a sleep mode between data transmissions. A Bluetooth Low Energy® communications link among multiple devices may be established using hardware, firmware, a host operating system, host software stacks, and/or host application support, for example. In accordance with aspects of the present disclosure, Bluetooth Low Energy technology may be implemented in automotive and/or other environments to wirelessly interconnect primary systems and accessory systems, such as when integrating operation of the ignition power system with various features, such as a dome lighting system.

According to various aspects of the present disclosure, FIG. 1 shows a representative diagram of an example system 100 that is configured to implement WPAN based technology, which may include for example, one or more Bluetooth Low Energy® devices, to interconnect at least one primary subsystem 102 with at least on accessory system 104. In system 100, primary subsystem 102 may be configured to operate in a two state system, for example, such as a first state 106 and a second state 108, wherein first state 106 may be represented by a first signal 110, and second state 108 may be represented by a second signal 112. In one example implementation specifically applicable in an automotive environment, the first signal 110 may be a 0V signal, wherein the 0V signal corresponds to the 'off' state of the primary subsystem 102, and the second signal 112 may be configured to be an approximately 12V signal, wherein the 12V signal corresponds to the 'on' state of the primary subsystem 102. Further, accessory system 104 may include a first state 114 and a second state 116, wherein first state 114 may correspond to an 'off' state of the accessory system, and the second state 116 may correspond to an 'on' state of the accessory system 104.

According to various aspects, the primary subsystem 102 may further include a signal detection device 122, wherein the signal detection device 122 may be configured to determine the state of operation of the primary subsystem 102. For example, the signal detection device 122 may determine whether the primary subsystem 102 is in the first state 106 or the second state 108. Further, the signal detection device 122 may additionally be configured to produce a signal corresponding to the state of the primary subsystem 102. For example, if the signal detection device 122 determines that the primary subsystem 102 is in the first state 106, the signal detection device 122 may produce the corresponding signal 110. However, if the signal detection device 122 determines that the primary subsystem 102 is in the second state 108, the signal detection device 122 may produce the signal 112, wherein signal 112 corresponds to the second state 108.

In one example implementation, system 100 may be configured such that the state of the primary subsystem 102 may determine the state of the accessory subsystem 104. Thus, if the primary subsystem 102 is in the first state 106, the accessory subsystem 104 may be placed or caused to be placed in the first state 114. Further, for example, if the primary subsystem 102 is in the second state 108, the accessory subsystem may be placed in or caused to be placed in the second state 116. Further, system 100 may alternatively be configured such that the primary subsystem 102 and the accessory subsystem 104 have an inverse relationship as compared to the above description. In this alternative example implementation, if the primary subsystem 104 is configured to be in the first state 106, the accessory subsystem may be placed in or caused to be placed in the second state 116, and if the primary subsystem is in the second state 108, the accessory subsystem may be configured to be placed in or caused to be placed in the first state 114.

In order to coordinate the state of the primary subsystem 102 and the accessory subsystem 104, the state of the primary subsystem 102 may be communicated from the primary subsystem 102 utilizing a first communication device 118 (the first communication device 118 being associated with the primary subsystem 102 and coupled to the signal detection device 122) to a second communication device 120 associated with the accessory subsystem 104, via the transmission of the produced signal 110 or 112 via a WPAN, using, for example, Bluetooth Low Energy® technology. In one example implementation, the first communication device 118 may utilize Bluetooth Low Energy® technology, such that the first communication device 118 may be configured to wirelessly transmit signal 110 or signal 112 to a second communication device 120, wherein the second communication device 120 may be associated therewith the accessory subsystem 104. In one example, at least one of the first communication device 118 and/or the second communication device 120 may be or include Bluetooth Low Energy® devices.

Accessory subsystem 104 may further comprise an accessory operation device 124, wherein the accessory operation device 124 may be coupled to the second communication device 120. Accessory operation device 124 may be configured to either cause a state change in the accessory subsystem 104 or inhibit a state change in the accessory subsystem 104, depending on the configuration of system 100. In one example implementation, if the signal determination device 122 determines that the primary subsystem 102 is in the first state 106 and consequently produces signal 110, that signal 110 may be transmitted from the first communication device 118 to the second communication device 120 via a WPAN. When signal 110 is received by the second communication device 120, the accessory operation device 124 may cause the state of the accessory device 104 to change from first state 114 to second state 116. In another example, receiving the signal 110 may result in the accessory operation device 124 causing the state of the accessory system 104 to change from second state 116 to first state 114. In one example, a change from first state 114 to second state 116 may turn on the power of component device 126, wherein component device 126 may be configured, for example, to cause an operation within the accessory subsystem. The component device 126 could be or include a dome light circuit, an under car light circuit, or a car door lock circuit, for example. Thus, turning on the power to the primary subsystem 102 may in turn result in the turning on of the dome light, undercar light, or locking of the car doors in an automotive application, for example.

However, in another example implementation, receiving the signal 110 may result in the accessory operation device 124 inhibiting the change in state of the accessory subsystem 204. In one example, accessory operation device 124 may inhibit the accessory subsystem 204 from changing from state 114 to state 116, such that the accessory subsystem 204 may be prohibited from engaging some state or set of tasks (e.g., car being started prevents operation of the dome light). Conversely, accessory component device 126 may be prevented from changing from state 116 to state 114. In one example, when prohibiting accessory system 104 from changing from state 114 to state 116, the accessory subsystem 104 may be prohibited from turning off power to the at least one component 126 (e.g., the headlights cannot be turned off).

Figure 2:
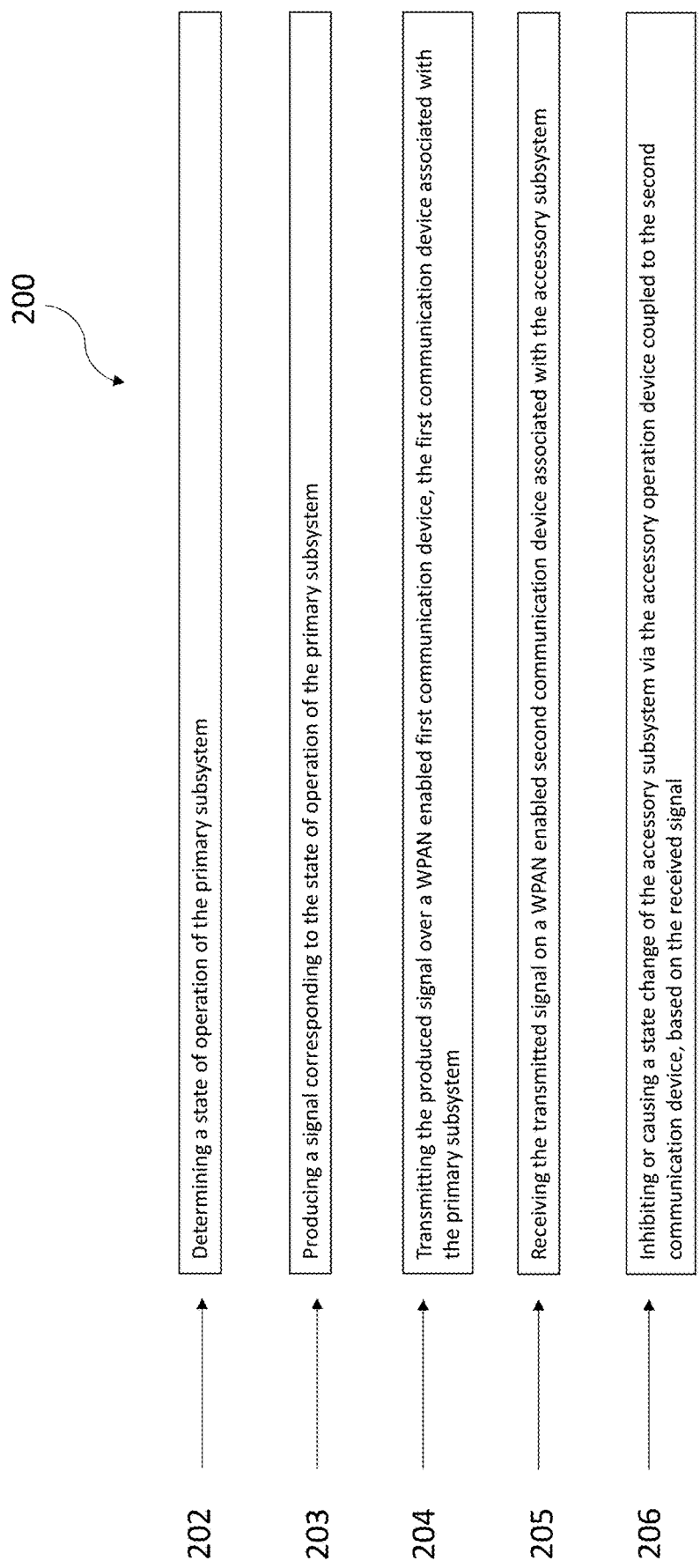
FIG. 2 shows a flowchart for an example method of wirelessly interconnecting electromechanical subsystems, according to various aspects of the present disclosure.

According to various aspects of the present disclosure, FIG. 2 illustrates a method 200 for implementing a system (e.g., system 100 of FIG. 2) configured to interconnect at least two electrical, mechanical, and/or electromechanical subsystems via the wireless transmission of data, signals, or other information via WPAN using, for example, Bluetooth Low Energy® technology. Method 200 may be implemented in an automotive environment; however, method 200 is not limited to this implementation, and may be implemented in household or boat environments, for example, as well as among other generally short transmission range environments. Method 200 may begin with a state of operation of the primary subsystem occurring, or the state changing 202. The state or change of state may then be detected 203. Following, a signal may be generated based on the detected state, such as by communicating the signal wirelessly over a WPAN enabled first communication device associated with the primary subsystem 204. Then, a WPAN enabled second communication device associated with the accessory subsystem may receive the communicated signal 205, wherein following, the accessory operation device coupled to the second communication device may either cause or inhibit a state change of the accessory subsystem based on the signal 206.

According to various aspects, the signal determination device may be configured to operate utilizing a voltage that differs from voltage implemented in the primary subsystem. Thus, in this example, the signal determined by the signal determination device associated with the primary subsystem may be stepped down from the operational voltage of the primary subsystem, to a voltage readable by or otherwise electrically compatible with first communication device. In one specific example, if the primary subsystem may be determined to have a first state when in an 'on' state, represented by an approximately 12V power level being present, whereas the first communication device may be configured to interoperate with a 3.3V signal, the signal determination device may be configured to step the 12V signal down to a 3.3V signal, such that various operations of the devices relating to detection of the primary subsystem may operate using the 3.3V signal. Similarly, in this example the second communication device may also be configured to operate utilizing a voltage that differs from the voltage implemented in the accessory operation device (e.g., 3.3V operation of the signal processing, while a 12V power level may be used with the accessory subsystem. Though some environments, such as automotive environments, may implement 12V and 0V signals to represent 'on' and 'off' states, for example, this specific voltage range is merely an example and not intended to be limiting. For example, in other automotive environments, other signals, such as in 6V or 24V signals may correspond to the 'on' state, whereas in some in home or other non-automotive environments and applications, 110V or 220V alternating current (AC) signals may be implemented to correspond to the 'on' or 'off' states, for example. A wide range of other various signals may be implemented to correspond to a wide variety of potential voltage environments. For example, a 24V signal may correspond to the 'on' state of the primary subsystem instead of a 12V signal. In another example, a 6V signal may correspond to the 'on' state of the primary subsystem.

However, for other example implementations, no step down in voltage may be appropriate or required, such as where the existing voltages are in an acceptable range for use by both the detecting/transmitting devices and the primary and accessory systems. In addition, a plurality of signals and voltages may be utilized to represent either the 'on' or 'off' state of the primary and/or secondary subsystem, and/or the primary and/or accessory subsystem may either or both be configured to include more than two states of operation.

In one example automotive implementation, the primary subsystem may be or include the ignition power subsystem, and an accessory subsystem may be dome lighting. In this example, when the ignition switch is configured to be in an 'off' state, the ignition subsystem may be detected to have a 0V power level. Upon this 0V power level detection occurring, a corresponding signal may be transmitted to the dome lighting subsystem, such that the dome light subsystem would then be enabled for operation (e.g., if the door were opened), or the dome light may be configured to be placed in an 'on' state (e.g., the dome light would be powered so as to be on, such as for a temporary period). However, when the ignition power subsystem is then configured to be in an 'on' state upon starting the engine, the ignition power subsystem would then have a 12V power level, resulting in a corresponding signal being generated to the dome light accessory subsystem (e.g., over WPAN using Bluetooth Low Energy® technology). For example, when the dome light accessory subsystem receives indication of the 12V signal in the ignition circuit, the dome light may be configured to automatically switch to an 'off' state, such that the lights are off, or, for example, the dome lights may be placed in a state such that they may not be manually operated by a driver or passenger.

Figure 3:
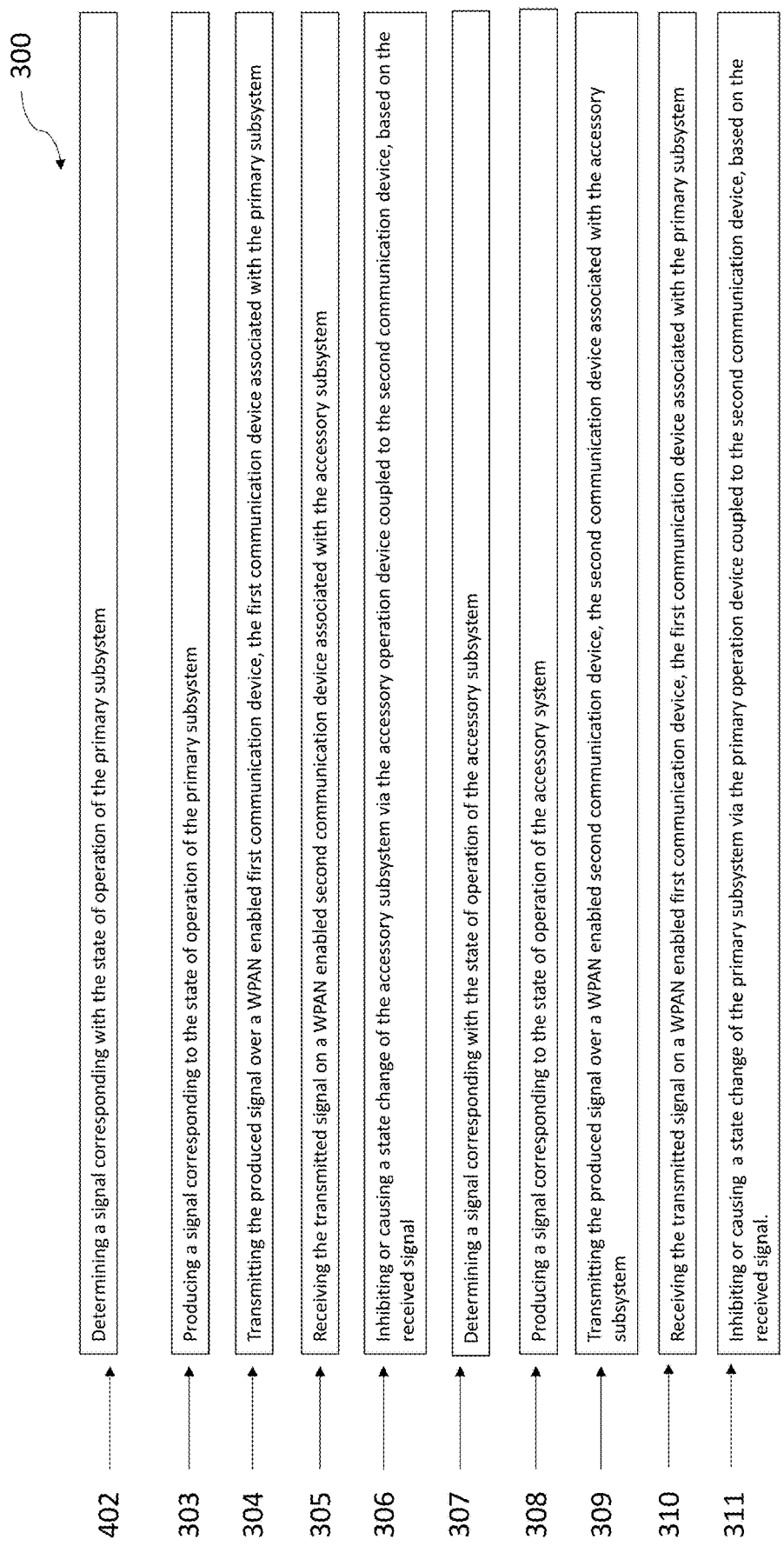
FIG. 3 shows a flowchart for an example method of interconnecting electromechanical subsystems, according to various aspects of the present disclosure.

According to various aspects of the present disclosure, FIG. 3 illustrates a method 300 for implementing a system configured to interconnect for two-way communication of at least two electrical, mechanical, or electromechanical systems via the transmission of data, signals, or other information over a WPAN, such as using Bluetooth Low Energy® technology. Method 300 may be comparable to method 200 of FIG. 2, but also may be further configured to facilitate the wireless communication or transmission of data, signals, or other information both from the primary subsystem to the accessory subsystem, and from the accessory subsystem to the primary subsystem. Similarly to method 200 of FIG. 2, method 300 of FIG. 3 may optionally begin with a state of operation of the primary subsystem occurring or changing 302, upon which a signal determination device associated with the primary subsystem may determine the state of the primary subsystem 303. Following, method 300 may include, based on the determined state of the primary subsystem, producing a signal corresponding to that state, and wirelessly transmitting the corresponding signal via the WPAN enabled first communication device 304, wherein the wirelessly transmitted signal may then be received by the second communication device associated with the accessory subsystem 305. Then, the accessory operation device coupled to the second communication device may either cause or inhibit a state change of the accessory subsystem 306. In addition, method 300 may be implemented in a system wherein the accessory operation device may additionally be configured to detect the state of the accessory system 307. Method 300 may continue with the accessory operation device determining a signal corresponding to the state of the accessory subsystem 308 and wirelessly transmitting the determined signal to the first communication device associated with the primary subsystem 309. Upon the first communication device receiving the signal from the accessory system 310, the signal determination device coupled to the first communication device may additionally be configured to either cause or inhibit a state change of the primary subsystem 311. Thus, method 300 describes a bi-directional method of communicating or otherwise transmitting data, for example, between two different electrical, mechanical, or electromechanical systems in a particular environment.

Figure 4:
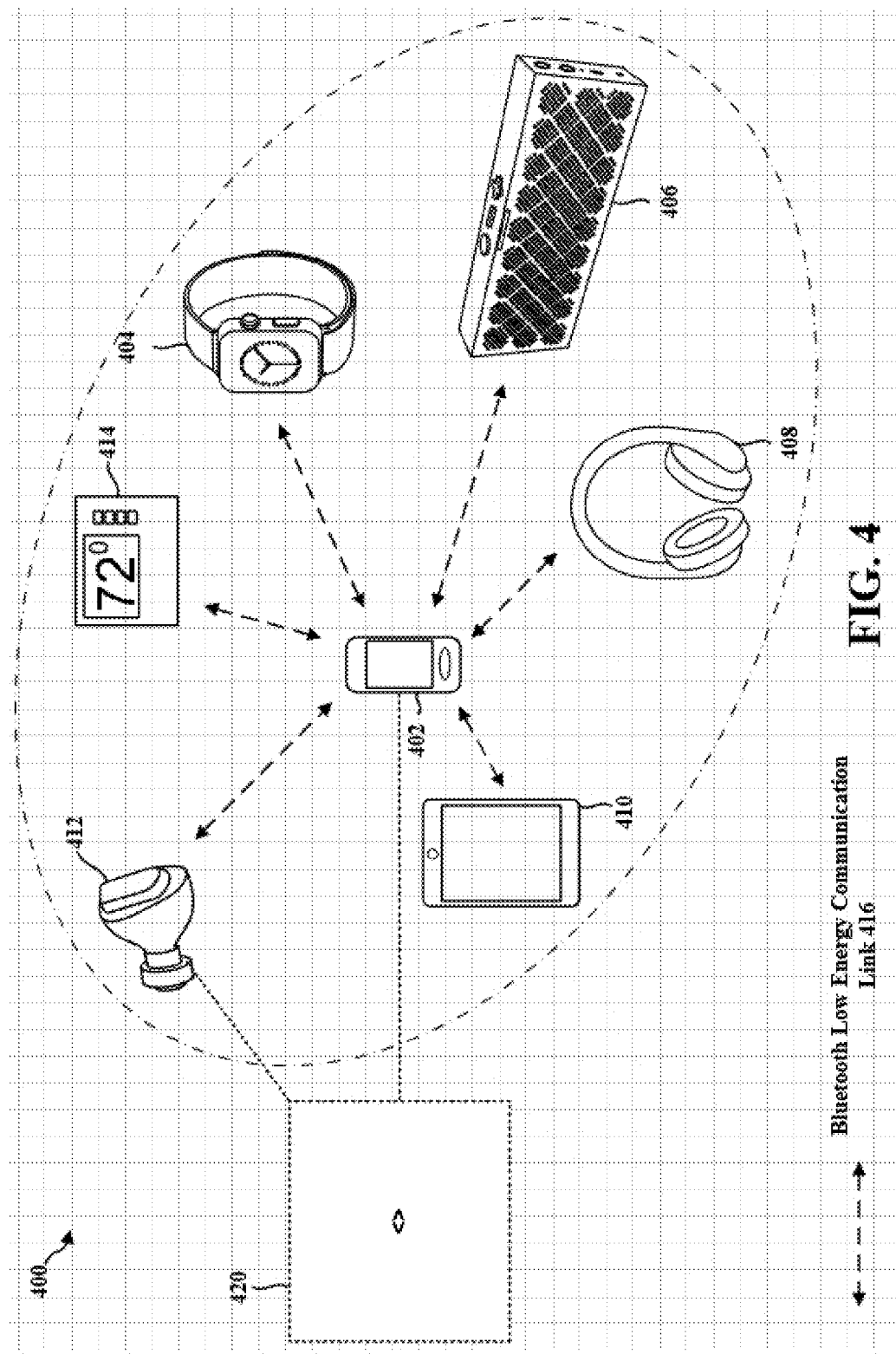
FIG. 4 shows a representative diagram of various components of an example system for interconnecting electromechanical subsystems, according to various aspects of the present disclosure.

FIG. 4 contains a representative diagram of various features and components of one example implementation of a WPAN 400 for use in accordance with aspects of the present disclosure. Within the WPAN 400, a primary electromechanical system 402 may connect to and establish a Bluetooth Low Energy® or other communication link with one or more accessory electromechanical system components 404, 406, 408, 410, 412, 414 using a Bluetooth Low Energy® protocol or a modified Bluetooth Low Energy® protocol, for example. The Bluetooth Low Energy® protocol is part of the Bluetooth® core specification, wherein the Bluetooth Low Energy protocol® may enable radio frequency communication operating within the globally accepted 2.4 GHz Industrial, Scientific & Medical (ISM) electromagnetic frequency band.

Examples of the primary subsystem 402 may include an ignition power switch, a cellular telephone, a smart phone, a session initiation protocol (SIP) phone, a mobile station (STA), a laptop, a personal computer (PC), a desktop computer, a personal digital assistant (PDA), a satellite radio, a global positioning system (GPS) device, a multimedia device, a video device, a digital audio player (e.g., MP3 player), a camera, a game console, a tablet, a smart device, a wearable device (e.g., smart watch, wireless headphones), a vehicle related processor, an electric meter, a gas pump, a toaster, a thermostat, a hearing aid, a blood glucose on-body unit, an Internet-of-Things (IoT) device, or any other similarly functioning device.

By comparison, examples of the one or more accessory subsystems 404, 406, 408, 410, 412, 414 may include any of or similar devices to devices making up subsystem 402, as well as other devices/subsystems, such as dome lighting, under car lighting, door locking mechanisms, door latching mechanisms, radio systems, an oven, household lights, or front door locks. Although the primary subsystem 402 is illustrated in communication with six accessory systems 404, 406, 408, 410, 412, 414 in the WPAN 400, the primary subsystem 402 may communicate with more or fewer than six peripheral devices within the WPAN 400 without departing from the scope of the present disclosure.

Further, the primary electromechanical system 402 may include suitable logic, circuitry, interfaces, processors, and/or code that may be used to communicate with one or more accessory electromechanical systems 404, 406, 408, 410, 412, 414 using the Bluetooth Low Energy® protocol or the modified Bluetooth Low Energy® protocol. In order to facilitate the communication among primary and accessory systems, the primary electromechanical system 402 may initiate a request to establish a link layer connection with an intended one or more than one of the accessory electromechanical systems 404, 406, 408, 410, 412, 414. However, in another example, the accessory electromechanical systems 404, 406, 408, 410, 412, and 414 may be configured to initiate a request to establish a link layer connection with an intended one or more than one primary electromechanical system 402.

In certain configurations, the primary subsystem 402 may be configured to transmit the first link layer data protocol data unit in each connection event to an intended accessory subsystem 404, 406, 408, 410, 412, 414. In certain other configurations, for example, the primary subsystem 402 may utilize a polling scheme to poll the intended accessory subsystems 404, 406, 408, 410, 412, 414 for a link layer data protocol data unit transmission during a connection event. The intended accessory subsystem 404, 406, 408, 410, 412, 414 may transmit a link layer data protocol data unit upon receipt of the packet link layer data protocol data unit from the central device 402. In certain other configurations, an accessory device 404, 406, 408, 410, 412, 414 may transmit the link layer data protocol data unit to the central device 402 without first receiving a link layer data protocol data unit from the primary subsystem 402. Each of the aforementioned potential configurations may allow a low energy communication among primary and accessory systems.

Specifically, a link layer connection in the Bluetooth Low Energy® protocol stack and/or modified Bluetooth Low Energy® protocol stack may provide for ultra-low power idle mode operation, simple device discovery, and/or reliable point-to-multipoint data transfer with advanced power-save and encryption functionalities (as compared to traditional Bluetooth®). After a requested link layer connection is established, the primary electromechanical system 402 may become a master device and the intended accessory electromechanical systems 404, 406, 408, 410, 412, 414 may become slave devices for the established link layer connection, wherein the primary electromechanical system 402 operating as a master device may support multiple link layer connections at a time with various accessory subsystems 404, 406, 408, 410, 412, 414. Additionally, the primary subsystem 402 as a master device, may be configured to manage various aspects of data packet communication in a link layer connection with the associated accessory subsystems 404, 406, 408, 410, 412, 414, configured to be slave devices. For example, the primary subsystem 402 may determine an operation schedule in the link layer connection with an accessory subsystem 404, 406, 408, 410, 412, 414, or may initiate a link layer protocol data unit exchange sequence over the link layer connection. Link layer connections may further be configured to run periodic connection events in dedicated data channels.

Figure 5:
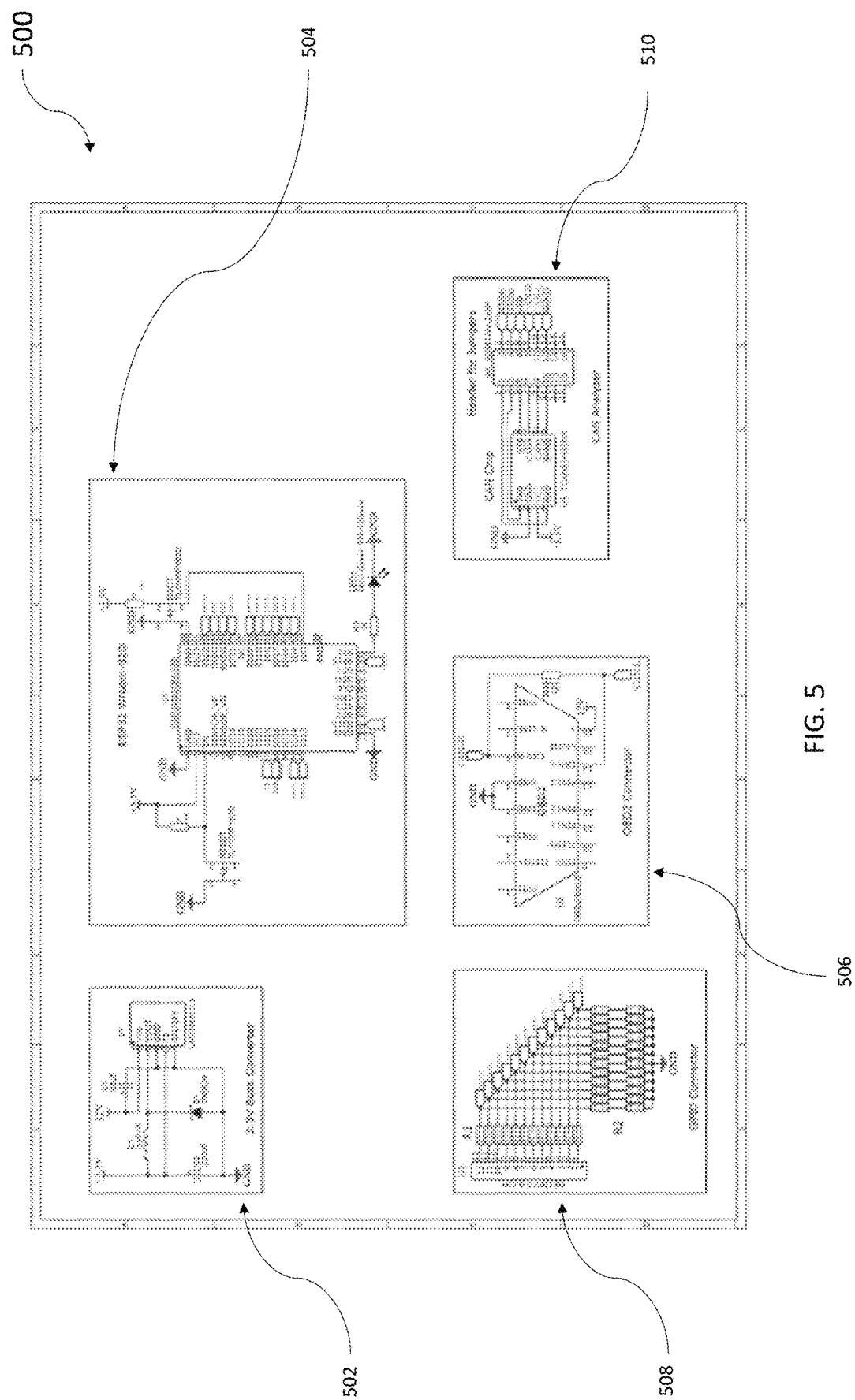
FIG. 5 shows a schematic diagram of various component features for use in an example implementation of a WPAN based system, according to various aspects of the present disclosure.

FIG. 5 illustrates various features of an example first communication device 500 usable in accordance with aspects of the present disclosure, wherein first communication device 500 may be associated with a primary subsystem, for example. The first communication device 500 may be configured to enable Bluetooth Low Energy® network technology, and/or other similar devices for WPAN operation, such that the first communication device 500 may transmit a signal corresponding to the state of the primary subsystem to a second communication device associated with an accessory subsystem. First communication device 500 may include a buck converter 502, wherein the buck converter 502 may be configured to step down a voltage from the voltage at the point of input to a specified device requirement, wherein the output includes a voltage less than the voltage at the point of input. For example, if a vehicle 12 volt power source is available as the input, and various components in the first communication device 500 require a 3.3 V power supply, the vehicle power supply must be stepped down to the required level. The buck converter 502 may include a power converter chip, such as an LM2596 Simple Switcher® Power Converter made by Texas Instruments of Dallas, TX, and at least one of an energy storage element, a capacitor, an inductor, or any two of the previous in combination. Buck converter 502 may be electrically connected a to a Bluetooth Low Energy® System-on-Chip (SoC) 504, wherein SoC 504 may be configured to enable Bluetooth Low Energy® device functionality and other similar WPAN related operations. In one example, SoC 504 may be or include an ESP32 Wroom-32D SoC, produced by Espressif Systems of Shanghai, China.

Figure 6:
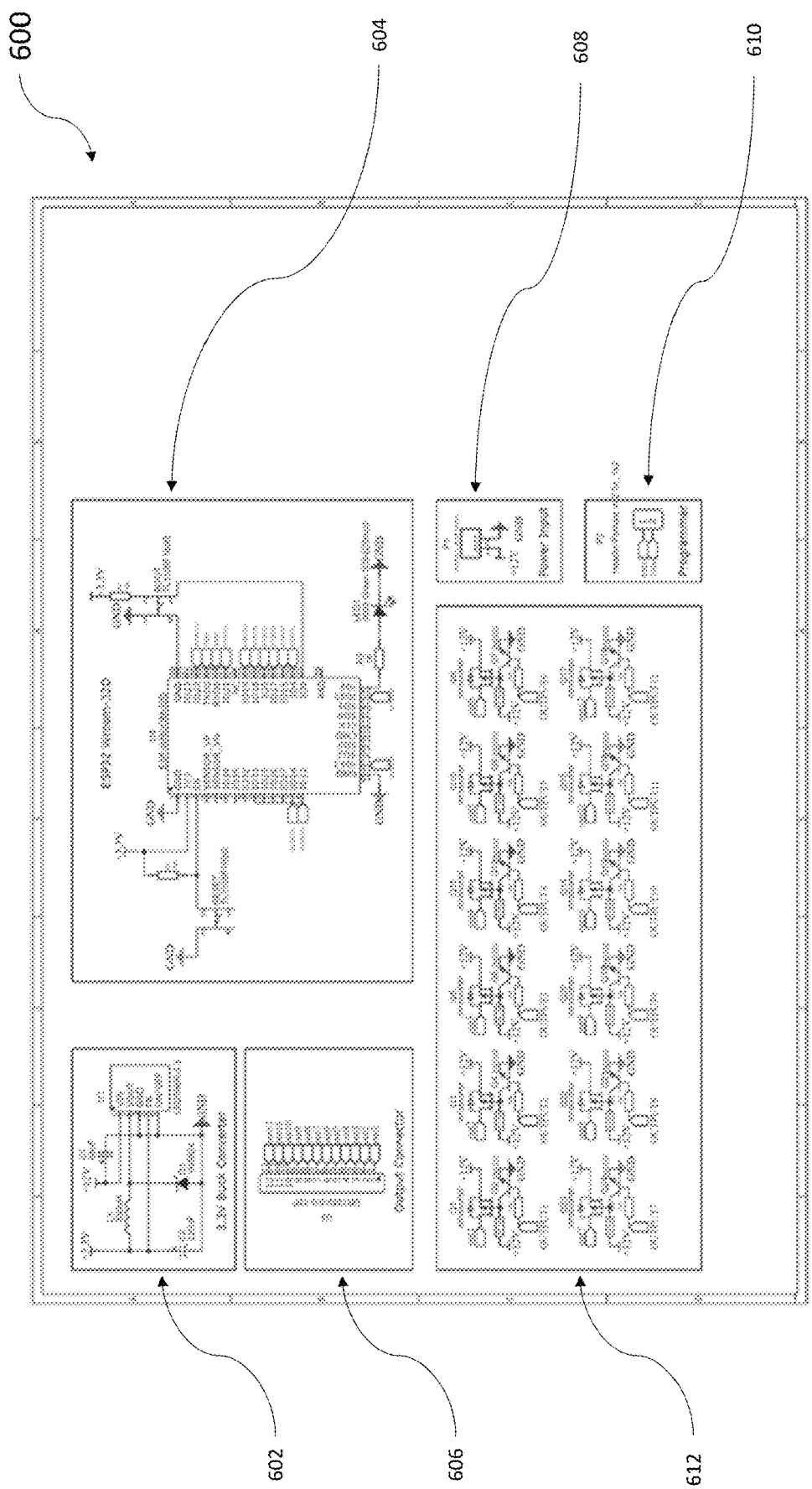
FIG. 6 shows a schematic of various components of a signal determining device for use with an example implementation of a WPAN based system, according to various aspects of the present disclosure.

Further, the first communication device 500 may also include an On-Board Diagnostics II (OBD2) connector 506, a General-Purpose Input/Output (GPIO) Connector 508, and/or a Controller Area Network (CAN) Analyzer 510. In one example, the OBD2 connector 506 may be configured to monitor a plurality of data inputs related to the function of an automotive environment, such as emissions, mileage, or speed. The GPIO Connector 508 may be configured to interoperate with the buck converter 502 and/or the SoC 504 in order to facilitate the contemporaneous operation of the first communication device 500 with a plurality of other communication devices, such as the second communication device of FIG. 6. The CAN Analyzer 510 may be configured to monitor and debug a high speed Controller Area Network, so as to facilitate the operation of first communication device 500. In one example CAN Analyzer 510 may be or include an TCAN334DCNR, produced by Texas Instruments of Dallas, Texas Further, a Controller Area Network may be designed for implementation in an automotive environment, and may include a robust standard designed to allow microcontrollers and devices to communicate without a host computer FIG. 6, according to various aspects of the present disclosure, illustrates an example second communication device 600, wherein the second communication device 600 may be associated with an accessory subsystem, for example. The second communication device 600 may be configured to enable Bluetooth Low Energy® network technology, or other similar WPANs, such that the second communication device 600 may receive a signal from a first communication device associated with the primary subsystem, such as first communication device 500 of FIG. 5 or first communication device 118 of FIG. 1. The first communication device 600 may include a buck converter 602, wherein the buck converter 602 may be configured to step up a voltage from the voltage received from the first communication device to the original voltage received by the first communication device, such as in the situation where the voltage received by the buck converter 602 from other components of device 600 is less than the voltage needed for output by buck converter 602. Similar to buck converter 502 of FIG. 5, buck converter 602 may include at least two semiconductors and at least one of an energy storage element, a capacitor, an inductor, or any two of the previous in combination. Further, the buck converter 602 may be electrically connected or otherwise coupled to a SoC 604, wherein SoC 604 may be configured to enable Bluetooth Low Energy® or another similar Wireless Personal Area Networks. The buck converter 602 may interoperate with SoC 604 to facilitate wireless communication and/or carrying out operations between first communication device 600 and other components of the accessory subsystem. SoC 604 may thereby be configured to interoperate with at least one component of the accessory system (not shown).

Further, the second communication device 600 may also include an output connector 606, a power input 608, and a programmer 610, and a transistor bus 612. The power input 608 may be configured to electrically connect to an external power source (not shown in FIG. 6) in order to support the operation of the second communication device 600. In one example implementation, the output connector 606 may be configured to output data or other information related to the operation of the second communication device 600. Further, the programmer 610 may allow for the second communication device 600 to be configured with or programed to interoperate with a plurality of other communication and/or other devices within the environment, such as the first communication device 500 of FIG. 5 and other components of the accessory subsystem. Further, programmer 610 may allow for an external operator, such as a technician, to manually connect to and interoperate with the buck converter 602 and/or the SoC 604. Similarly, a chip or other component having a series of transistors 612 may be configured to interoperate with the buck converter 602 and/or the SoC 604 in order to facilitate selective interface of a suitable number of different devices or components to be operated via the second communication device 600. Each such device to be operated, for example, may be governed by one or more of the plurality of transistor driven circuits in the bus 612 via the output of the corresponding circuit. Transistor bus 612 shows as an example such chip or other component having 12 such selectively operable transistor circuits in parallel.

By way of example, an element, or any portion of an element, or any combination of elements may be implemented as a "processing system" (hereinafter interchangeably referred to as a "signal determination device") that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In another variation, the method and system in accordance with aspects of the present disclosure may operate in a stand-alone environment, such as on a single terminal. While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A system for wirelessly interconnecting electromechanical subsystems, the system comprising:
   at least one primary electromechanical subsystem, the primary electromechanical subsystem having associated therewith:
   a signal determination device, the signal determination device being configured to determine a state of the primary electromechanical subsystem and produce a signal, the signal corresponding to the determined state of the primary electromechanical subsystem;
   a first communication device coupled to the signal determination device, the first communication device being configured to wirelessly transmit the produced signal via a wireless personal area network; and
   a primary operation device coupled to the first communication device, the primary operation device configured to cause or inhibit a state change of the at least one primary electromechanical subsystem; and
   at least one accessory electromechanical subsystem, the accessory electromechanical subsystem having associated therewith:
   a second communication device, the second communication device being configured to wirelessly receive the signal corresponding to the state of the primary electromechanical subsystem via the wireless personal area network;

an accessory operation device coupled to the second communication device, the accessory operation device being configured to cause or inhibit a state change of the at least one accessory electromechanical subsystem; and a second signal determination device coupled to the second communication device, the second signal determination device configured to determine a state of the accessory electromechanical subsystem and produce a signal, the signal corresponding to the determined state of the accessory electromechanical subsystem.

2. The system of claim 1, wherein the signal determination device or the accessory operation device includes a microprocessor.

3. The system of claim 1, wherein the signal determining device or the accessory operation device includes a transistor.

4. The system of claim 1, wherein the wireless area personal area network includes a Bluetooth® Low Energy component.

5. The system of claim 1, wherein the state change of the at least one accessory electromechanical subsystem includes powering an on switch component of the at least one accessory subsystem.

6. A method of interconnecting electromechanical subsystems, each of the electromechanical subsystems configured to include more than one state of operation, the method comprising:

determining in which state a primary electromechanical subsystem is operating;

producing a signal that corresponds to the determined state of the primary electromechanical subsystem;

communicating the produced signal over a wireless personal area network to an accessory electromechanical system, a first communications device being associated with the primary electromechanical system, a second communications device being associated with the accessory electromechanical system;

causing or inhibiting a state change of the accessory electromechanical subsystem based on the signal received from the first communication device associated with the primary electromechanical subsystem, wherein the signal corresponding to the determined state of the primary electromechanical system is reduced from an initial voltage to a voltage compatible with the first communication device, the initial voltage being compatible with an accessory operation device coupled to the second communication device, and wherein the signal received by the second communication device is increased from the voltage compatible with the first communication device to the initial voltage.

7. A method of interconnecting electromechanical subsystems, each of the electromechanical subsystems configured to include more than one state of operation, the method comprising:

determining in which an accessory electromechanical subsystem is operating;

producing a signal corresponding to the determined state of the accessory electromechanical subsystem;

communicating the produced signal over a wireless personal area network to a primary electromechanical subsystem, a first communications device being associated with the primary electromechanical system, and a second communications device being associated with the accessory electromechanical system;

causing or inhibiting a state change of the primary electromechanical subsystem based on the signal communicated to the primary electromechanical subsystem, wherein the signal corresponding to the determined state of the accessory electromechanical system is reduced from an initial voltage to a voltage compatible with the second communication device, wherein the initial voltage is compatible with a primary operation device coupled to the first communication device, and wherein the signal received by the first communication device is increased from the voltage compatible with the second communication device to the initial voltage.

* * * * *